Sept. 11, 1951     A. L. BOUGHAN     2,567,760
BALER SALTER
Filed July 27, 1948     2 Sheets-Sheet 1
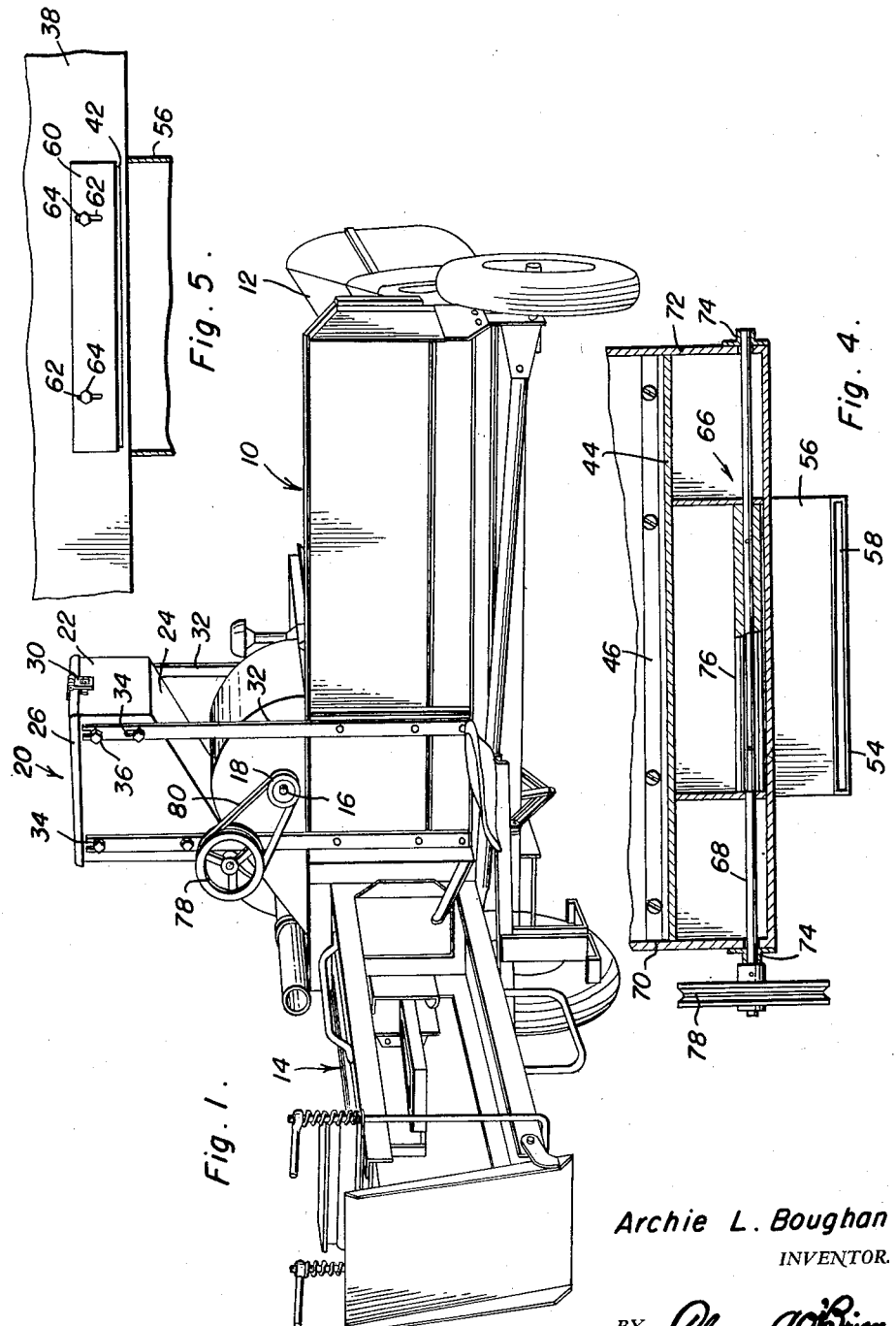
Archie L. Boughan
INVENTOR.
BY

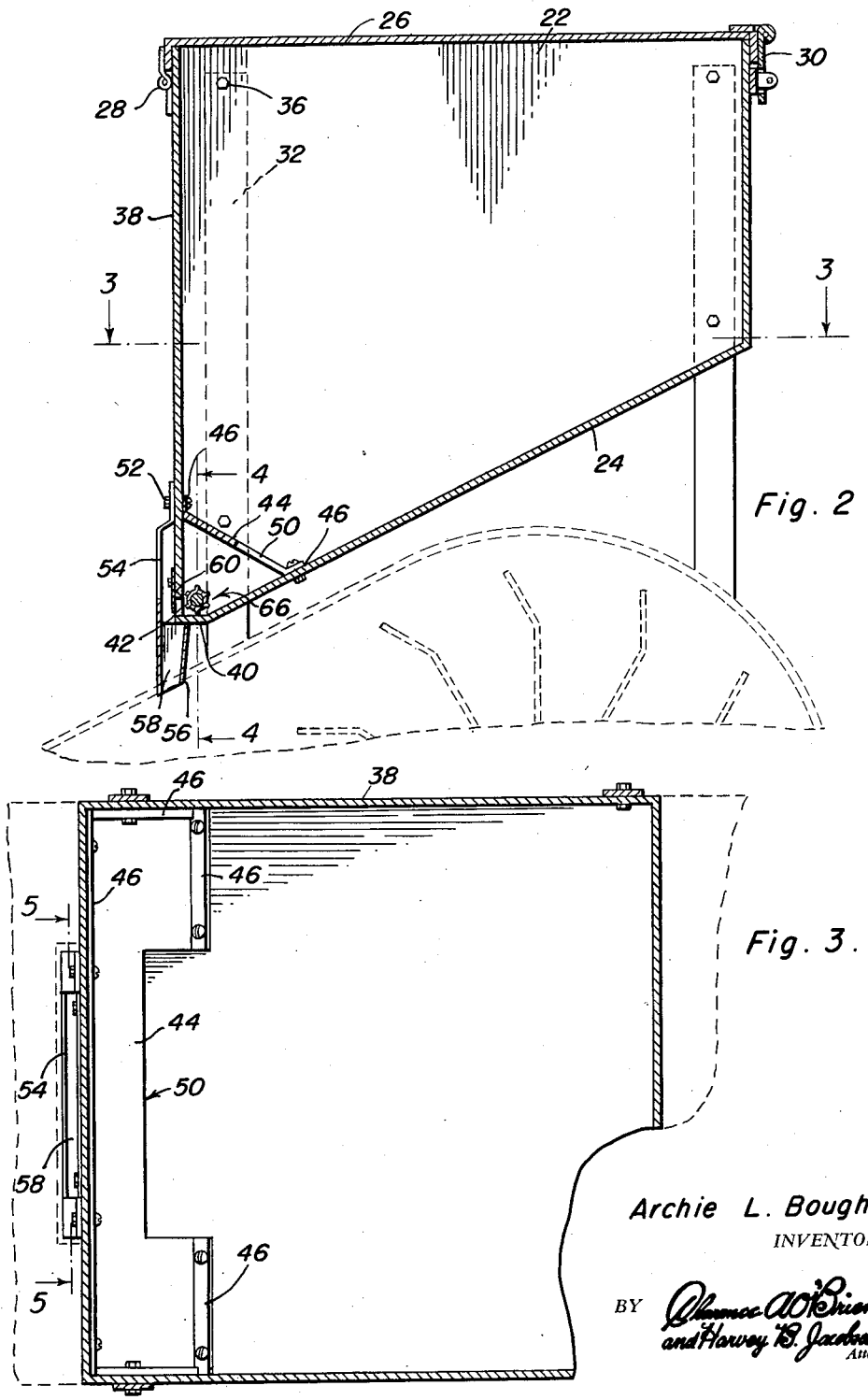

Patented Sept. 11, 1951

2,567,760

UNITED STATES PATENT OFFICE 2,567,760

BALER SALTER

Archie L. Boughan, Taylor, Mo.

Application July 27, 1948, Serial No. 40,950

1 Claim. (Cl. 99—235)

This invention relates to improvements in salting hay during the baling thereof to inhibit the molding of the hay while being baled.

The salt absorbs moisture in the bale when the latter is in sweat. Thus, the molding of the hay in the bale is retarded. By adding salt to the hay during the baling thereof, less curing in the field is required, the color of the hay is preserved, and a richer feed is obtained.

Also, by adding salt to the hay during the baling thereof, it no longer becomes necessary for the feeder to add salt to the hay.

The primary object of this invention is to provide a novel attachment for a hay baler whereby salt may be evenly dispersed throughout the hay at the point just prior to the baling of the latter.

Another object of this invention is to provide a novel attachment for a conventional hay baler whereby salt or any other granulated preservative may be delivered to the hay just prior to the time that it is packed in bales, which attachment is provided with means driven by one of the rotating conveyor shafts of the baler itself for evenly and continuously delivering the salt or preservative through an outlet conduit in the attachment, the opening of said outlet conduit being adjustably restricted so that the amount of salt deposited on the hay may be controlled.

A still further object of this invention is to provide a novel salter attachment to any conventional hay baler, preferably the Case baler #77. NPN., which is simple in construction and design, easy to assemble, and which can be readily attached to the baler with a minimum of effort.

These, together with various ancillary objects and features of the invention which will later become apparent as the following description proceeds, are attained by the device, a preferred embodiment of which has been illustrated by way of example only in the accompanying drawings, wherein;

Figure 1 is a perspective view of the salter attachment of the instant invention in association with a conventional baler;

Figure 2 is a vertical sectional view of the salter itself;

Figure 3 is a horizontal sectional view taken substantially on the plane of section line 3—3 of Figure 2;

Figure 4 is a vertical sectional view taken substantially on the plane of section line 4—4 of Figure 3;

Figure 5 is a sectional view taken substantially on the plane of section line 5—5 of Figure 3 and looking in the direction of the arrows.

Specific reference is now made to the drawings. In the several views in the accompanying drawings and in the following specification reference characters indicate corresponding elements throughout.

Generally indicated at 10 is a conventional hay baler which includes a chute 12 for receiving the hay which is in turn conveyed to the portion 14 where the hay is actually packed into bales. Adjacent the discharge end of the conveyor normally associated with the baler is a rotatable conveyor shaft 16 to which is secured pulley 18.

The salter of the instant invention generally indicated at 20 is mounted on the baler adjacent the discharge end of the conveyor and at the point just prior to the baler portion 14. The salter consists essentially of a hopper 22 in the shape generally of a box except that the base member 24 slopes downwardly and rearwardly. The hopper 22 is additionally provided with a cover 26 which is hinged as at 28 to a side member of the hopper and which carries at its other end a conventional latch 30 for keeping the cover 26 in a closed position when desired upon the hopper. The hopper is retained on the baler 10 by means of a plurality of uprights 32 which are secured adjacent their bottom portions to the frame of the baler and which are provided adjacent their top portions with vertically extending slots 34 for engagably receiving bolts 36 whereby the salter is vertically adjustable upon the upright 32 relative to the baler.

The side wall 38 of the hopper extends to a position somewhat above the bottom lip portion 40 of the sloping base member 24 thereby providing a transversely extending opening 42 whereby the salt may leave the hopper.

Extending transversely within the hopper at a position above the opening 42 is a partition 44 which is angulated as shown in Figure 2 and is provided with flanges 46 which are secured respectively to the side wall 38 and the sloping base member 24. A transversely extending cutout 50 is provided in the partition member for the salt to pass through before being discharged through the opening or outlet 42.

Secured to the side member 38 of the hopper by means of appropriate bolts 52 and extending transversely of the side member is a plate 54, configurated as shown in Figure 2, which is spaced from the side wall 38 and overlies the opening 42. Another plate 56 is provided which is somewhat angulated and extends downwardly from the lip portion 40 of the sloping bottom member 24. Thus, a transversely extending outlet conduit 58 is provided between the plates 54 and 56 respectively.

As shown more clearly in Figure 5, a means is provided for restricting the opening 42 so that the amount of salt being emitted therefrom may be effectively controlled, which means consists essentially of a transversely extending plate 60 overlying the opening 42. The side member 38 of the hopper is provided with longitudinally extending slots 62 for engageably receiving adjustable bolts 64 so that the plate 60 may be longitudinally adjusted upon the side member 38 thus enlarging or restricting the opening 42 as desired.

As shown more clearly in Figure 4, the salter attachment is additionally provided with a dispersing element generally indicated at 66 which is interposed between the partition 44 and the discharge opening 42. This dispersing element consists of a rod or shaft 68 positioned transversely through the hopper and extending through the end walls 70 and 72 respectively thereof and is rotatable in suitable journals 74 secured to the end walls 70 and 72. Positioned substantially centrally of the shaft 68, a plurality of axially extending radial fins or blades 76 are secured to and rotatable with the shaft 68. At one end of the shaft extending through an end wall of the hopper, a conventional sheave 78 is provided which is also rotatable with the shaft. As shown in Figure 1, an endless belt 80 is entrained over the pulley 18 and the sheave 78 whereby the shaft 68 is drivingly connected to the conveyor shaft 16 of the baler 10.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In combination with a hay baler including a driven shaft and a pulley thereon, an attachment for delivering salt to the hay during the baling of the latter comprising a hopper having a sloping bottom wall, means adjacent said wall for restricting passage of salt through said hopper, an outlet conduit at the bottom of said hopper, means for adjusting the opening of said outlet conduit, a rotatable shaft below said restricting means and immediately adjacent said outlet conduit, impeller blades carried by said shaft, and means drivingly interconnecting the pulley on the driven shaft and said rotatable shaft, said restricting means including a partition extending through said hopper having a transversely extending slot immediately adjacent said sloping bottom wall, said shaft and impeller blades being disposed vertically beneath the unslotted portion of said partition, said adjusting means including longitudinally extending slots in a side wall of said hopper, a transverse plate overlying the opening of said outlet conduit having depending lugs extending through said slots, and means for retaining said lugs in said slots at different levels.

ARCHIE L. BOUGHAN.

REFERENCES CITED

The following references are of record in the file of this patent:

UNITED STATES PATENTS

| Number | Name | Date |
|---|---|---|
| 353,436 | Andrus | Nov. 30, 1886 |
| 506,892 | Wiebe | Oct. 17, 1893 |
| 671,726 | Gray | Apr. 9, 1901 |
| 2,217,103 | Cooke | Oct. 8, 1940 |
| 2,313,715 | Andlauer | Mar. 16, 1943 |